United States Patent
Xia et al.

(10) Patent No.: US 12,273,156 B2
(45) Date of Patent: Apr. 8, 2025

(54) METHOD AND APPARATUS FOR ELIMINATING SAME-FREQUENCY AND ADJACENT-FREQUENCY INTERFERENCE IN ANALOG DOMAIN

(71) Applicant: ANYWAVE COMMUNICATION TECHNOLOGIES CO., LTD., Changshu (CN)

(72) Inventors: Jingsong Xia, Hawthorn Woods, IL (US); Wenhua Li, Lincolnshire, IL (US); Bowei Song, Changshu (CN); Yingying Fan, Changshu (CN)

(73) Assignee: ANYWAVE COMMUNICATION TECHNOLOGIES CO., LTD., Changshu (CN)

( * ) Notice: Subject to any disclaimer, the term of this patent is extended or adjusted under 35 U.S.C. 154(b) by 0 days.

(21) Appl. No.: 17/905,992

(22) PCT Filed: Jun. 1, 2021

(86) PCT No.: PCT/CN2021/097579
§ 371 (c)(1),
(2) Date: Sep. 9, 2022

(87) PCT Pub. No.: WO2022/057315
PCT Pub. Date: Mar. 24, 2022

(65) Prior Publication Data
US 2023/0198577 A1    Jun. 22, 2023

(30) Foreign Application Priority Data

Sep. 15, 2020   (CN) ......................... 202010964784.5

(51) Int. Cl.
*H04B 7/015*     (2006.01)
*H04B 1/10*      (2006.01)

(52) U.S. Cl.
CPC ........... *H04B 7/015* (2013.01); *H04B 1/1027* (2013.01)

(58) Field of Classification Search
CPC ............................... H04B 10/27; H04B 7/015
USPC ......................................................... 375/262
See application file for complete search history.

(56) References Cited

U.S. PATENT DOCUMENTS

2022/0200143 A1*   6/2022   Guo ..................... H01Q 17/008

\* cited by examiner

*Primary Examiner* — Leila Malek
(74) *Attorney, Agent, or Firm* — CBM PATENT CONSULTING, LLC

(57) ABSTRACT

A method and device for eliminating co-frequency and adjacent frequency interference in an analog domain, in the case that a wireless communication device with a receiving antenna, that is, a transmitting point of a master device, detects and judges the presence of co-frequency and/or adjacent frequency interference signal sources on site, collects the reference signals of the same frequency and/or adjacent frequency from the interference signal sources by means of cable direct connection or adding an antenna, and obtains the analog signals of the same frequency and/or adjacent frequency interference after interference signal recovery processing, then, in the analog domain, the received signal received by the receiving antenna of the master device is directly subtracted from the interference analog signal of the same frequency and/or adjacent frequency to complete the analog interference cancellation process, so as to obtain the interference canceled RF analog signal.

10 Claims, 4 Drawing Sheets

METHOD AND APPARATUS FOR ELIMINATING SAME-FREQUENCY AND ADJACENT-FREQUENCY INTERFERENCE IN ANALOG DOMAIN

TECHNICAL FIELD

The present invention relates to a technology in the field of wireless communication, specifically a method and device for canceling co-channel and adjacent-channel interference in the analog domain.

BACKGROUND TECHNIQUE

In the current scenario of increasingly scarce spectrum resources, the desire is to make the most efficient use of the existing spectrum. Often, signal towers have more than one transmitting antenna operating on different channels. Therefore, in practical applications, it is not uncommon for equipment to experience interference from its channel (such as channel N) and/or its adjacent channels (such as upper and lower adjacent channels, N±1). Particularly, when the equipment has a receiving antenna, the antenna may capture interference signals from its transmitted co-channel signals or adjacent channel signals from co-located transmitters while collecting useful signals. Depending on the locations and transmit powers of the respective transmitters, these interference signals may even be much stronger than the desired signals to be received. These interference signals not only increase the baseline noise (co-channel and adjacent channel interference) of the current receiving channel N but may also saturate the receiving equipment and related components, including analog-to-digital converters, etc., thus making it impossible to effectively receive the signals on the desired channel N.

Upon reviewing existing technologies, Chinese Patent Document CN102726013A discloses a system and method for echo cancellation in an on-channel repeater used for improving coverage in the field of digital signal processing. This technology cancels strong echoes in the analog domain by adding and subtracting analog signals before the signal enters the analog-to-digital converter. However, after restoring the echoes with a digital signal processor, this technology requires further steps such as digital-to-analog conversion, and frequency conversion operations to obtain analog signals, then ultimately completes echo cancellation in the analog domain. These operations, influenced by the dynamic range of the devices and their specifications, can lead to increased signal baseline noise, compromised signal quality, and compressed amplitudes, thereby affecting the performance of echo cancellation. Additionally, the reference signal used by this technology to generate echo signals is a digital signal within the digital signal processing module, and this signal has not undergone actual processes such as digital-to-analog conversion, frequency up-conversion, power amplification, and antenna output in the upper conversion link in practical transmission. The difference in delay, phase, and amplitude between this signal and the echo signals in the mixed signals received by the actual receiving antenna may not make it an ideal reference signal. Moreover, this technology does not compensate for differences in delay, phase, and amplitude. As a result, when the transmission link is long, and there are significant differences in delay, phase, and amplitude, it may exceed the range that echo cancellation can handle, making it impossible to eliminate echoes. Most importantly, this technology can only handle echo from itself, i.e., interference from known signals, and has no way to deal with interference from other unknown signals, such as interference from other co-channel or adjacent channel transmitting equipment collocated, which is a significant limitation compared to the present invention.

SUMMARY OF THE INVENTION

The present invention addresses the scenario in existing wireless communication devices with receiving antennas, where, while receiving valid signals through the receiving antenna, interference signals of the same channel or even adjacent channel(s) may also be received. In response to this, a method and device for canceling co-channel and adjacent-channel interference in the analog domain are proposed. This is achieved by introducing the same channel and/or adjacent channel signals as reference signals in the analog domain to recover the interference signals. Subsequently, these interference signals are canceled in the radio frequency analog domain, thereby improving the signal quality received by the receiving antenna.

The present invention is achieved through the following technical solutions:

The invention involves a method for analog domain cancellation of co-channel and adjacent-channel interference in wireless communication devices with receiving antennas. Specifically, at the transmission point of the wireless communication device, when on-site detection and assessment reveal the presence of co-channel and/or adjacent-channel interference signal sources, a process is initiated. This process involves collecting reference signals from the interference signal sources, which may be co-channel and/or adjacent-channel, either through direct connection via cable or by adding additional antennas. After undergoing interference signal recovery processing, the analog co-channel and/or adjacent-channel interference signals are obtained. Subsequently, in the analog domain, these interference analog signals are directly subtracted from the received signal from the receiving antenna of the wireless communication device, completing the analog interference cancellation process and resulting in RF analog signals with reduced interference.

The on-site detection and assessment, as described, refer to the examination conducted at the main device's transmission point. This involves checking whether there are other authorized signals present on the channel $F_N$ and its adjacent channels $F_{N+m}$ and $F_{N-m}$. The determination of whether these signals qualify as interference signals is made by measuring the intensity of these authorized signals.

The criteria for identifying interference signals include but are not limited to, signals with strength greater than that received by the main device's receiving antenna; or signals with strength less than that received by the main device's receiving antenna, but in which the interference signals increase the background noise in the main device's received signal, reduces the signal-to-noise ratio, and consequently renders the received signal from the main device unusable.

The "direct connection via cable" refers to establishing a direct connection to the interference signal source or its coupled signal through cable to directly obtain the interference signal as a reference signal.

The "adding additional antennas" refers to the addition of reference receiving antennas oriented toward the source of the interference signals within the main device to indirectly obtain the interference signal as a reference signal.

The method of "direct connection via cable" is applicable when the interference signal source is not far from the main device, and it falls under situations where the main signal or its coupled signal emitted by the interference signal source can be acquired via cable. Its advantages include: the retrieved interference reference signal has stable intensity, contains the complete content of the interference signal, and is conducive to recovering the interference signal within the main device.

The method of "adding additional antennas" is suitable when it is not feasible to directly obtain the emitted signal from the interference signal source or its coupled output. This method is also preferred when the interference signal source is at a considerable distance from the main device, resulting in significant delays. The advantages of this approach include: the retrieved interference reference signal is similar in the channel conditions and delays as the signals received by the main device's receiving antenna, facilitating the recovery of the interference signal within the main device.

The "interference signal recovery processing" refers to adjusting the delay, and/or phase, and/or amplitude of the directly or indirectly obtained interference signal to recover the co-channel and/or adjacent-channel interference analog signals.

The "analog interference cancellation processing" refers to, in the analog domain, subtracting the recovered co-channel and/or adjacent-channel interference analog signals from the RF signal received by the receiving antenna of the main device. This results in obtaining an RF analog signal with reduced interference. The method includes but is not limited to, dynamic adjustments using analog domain adders or combiners. The goal is to achieve optimal performance of the RF analog signal after interference cancellation, including, but not limited to, measuring the RF analog signal after interference cancellation to maximize signal-to-noise ratio, effective power, shoulder or adjacent-channel suppression.

The dynamic adjustment mentioned refers to parameter iteration based on the direction of performance changes in the RF analog signal after interference cancellation, utilizing exhaustive methods, inflection point methods, bisection methods, or their combinations.

The term "exhaustive method" refers to systematically testing each possible control value within the adjustable range of each controlled variable. This involves attempting every available value for each variable and selecting the value that achieves the most optimal outcome after exhausting all possibilities. The advantage of this method lies in finding an optimal solution, but it has the drawback of requiring extensive time since it explores all values.

The "inflection point method" refers to sequentially testing each available control value within the adjustable range of a controlled variable in any direction (e.g., from small to large or from large to small). By comparing the results at different points, an inflection point is identified, such as the point where effective power consistently decreases until it starts to increase or where the signal-to-noise ratio consistently increases until it starts to decrease. This recorded point is called the inflection point, and it is chosen as the output for that controlled variable. The method offers the advantage of finding a relatively optimal point within the effective range and is more time-efficient compared to the exhaustive method.

The "bisection method" mentioned refers to, within the adjustable range of controlled variables, initially selecting values equal to the minimum, midpoint, and maximum of that range as control signals. For example, in the first iteration, these correspond to 0, $0.5*V_{max}$, and $V_{max}$. A comparison is then made to determine which of these points corresponds to the most optimal signal effect. Subsequently, the next iteration narrows the range to 50% of the previous one, centered around the identified optimal point. For instance, if the optimal effect corresponds to the point where 0 is the most favorable, the next set of three points for testing would be 0, $0.25*V_{max}$, and $0.5*V_{max}$. If the optimal effect corresponds to the point where $0.25*V_{max}$ is most favorable, the next set of testing points would be $0.125*V_{max}$, $0.25*V_{max}$, and $0.375*V_{max}$. If the optimal effect corresponds to the point where 0 is most favorable, the next set of testing points would be 0, $0.125*V_{max}$, and $0.25*V_{max}$. Through each iteration, the range for the next iteration is determined and narrowed to 50% of the previous range. This method enables rapid reduction of the search range, significantly reducing the number of points that need testing, until finally confirming the optimization of a single point. Compared to the inflection point method, this approach yields results more quickly."

This present invention refers to a system for canceling co-channel and/or adjacent-channel interference in the analog domain. The system includes an interference signal recovery module and an interference recovery control module. The interference signal recovery module receives at its input at least one interference signal obtained directly or indirectly and outputs co-channel and/or adjacent-channel interference analog signals. These signals, upon subtraction from the main received signal by the main device's receiving antenna, serve as input for the interference recovery control module and other subsequent processing modules. The interference recovery control module outputs control signals to the interference signal recovery module based on computed trends in indicator changes. These control signals adjust/confirm specific operations and parameters involved in the recovery process. The optimized co-channel and/or adjacent-channel interference analog signals, when subtracted from the received signal by the main device's receiving antenna, result in the RF analog signal with reduced interference.

When there are at least two interference signals, such as co-channel and adjacent-channel interference, corresponding cable are connected, or additional reference receiving antennas are established facing different interference sources. This is done to directly or indirectly obtain interference signals serving as reference signals. The sequence of interference signal recovery and the corresponding reference signals are controlled by the interference signal recovery module.

The signal recovery module comprises delay adjustment sub-modules, phase adjustment sub-modules, and amplitude adjustment sub-modules, each connected to the interference recovery control module and receiving its control signals. The delay adjustment sub-modules are responsible for adjusting the delay between the interference reference signal and the RF signal received by the main device's receiving antenna. The phase and amplitude adjustment sub-modules are used to adjust the phase and amplitude of the interference reference signal to closely match the interference signal contained in the received signal. This ensures accurate interference recovery and cancellation. The control signals include the selection and sequence of sub-module usage, interference delay settings, and phase and amplitude adjustment settings.

Typically, the delay is determined by the relative position of the main device's receiving antenna and the interference signal source, as well as the method of obtaining the interference reference. A greater relative distance results in a relatively larger delay, while a closer relative position results in a relatively smaller delay. If interference reference signals are obtained through a specifically designated reference receiving antenna, the relative position between the reference receiving antenna and the main antenna also plays a role.

The interference recovery control module calculates indicators of the subtracted results, including but not limited to signal-to-noise ratio, effective power, and shoulder or adjacent-channel suppression. Based on the levels and direction of performance indicator changes, the control module adjusts the selection and sequence of sub-modules, delay settings, and phase and amplitude adjustment settings.

The adjustments include setting a user-defined adjustable range and adjustable step size for the control signals of delay, phase, and amplitude. Each time, one variable in the control signals is optimized using exhaustive methods, inflection point methods, bisection methods, or their combinations to achieve the optimal signal effect. After one variable is done, the same methods are applied successively to obtain optimal solutions for the remaining variables.

The preferred order of adjustments is to first adjust the delay, then adjust the phase, and finally adjust the amplitude. Alternatively, adjusting the phase and amplitude may precede adjusting the delay. To pursue the optimal result, an additional round of adjustments may be conducted after obtaining initial results, optimizing the adjustments of each variable.

The preferred method of adjustment is with an adjustable step size.

The RF analog signal with reduced interference is further used for conversion into baseband digital signals for processes such as echo cancellation. After digital-to-analog conversion, up-conversion, and power amplification, the signal is finally output through the transmitting antenna.

Technical Effects

Compared to existing technologies, the improvements generated by the present invention include: 1) The reference signal is obtained via a direct cable connection or the use of a specifically designated antenna. Therefore, this invention can address interference signals not only limited to echo interference caused by its own transmitted signals but can also effectively counteract a broader range of co-channel and/or adjacent-channel interference introduced by other local transmission signals. This significantly expands the interference range compared to existing technologies. 2) Interference from co-frequency and/or adjacent-frequency sources is directly processed in the RF analog domain, as opposed to existing technologies that handle interference in the baseband and digital domain. This effectively avoids saturation of analog-to-digital converters and down-conversion devices in the downlink, preventing significant degradation of the useful signal's performance due to strong interference signals. Therefore, compared to existing technologies, this invention can cancel interference of greater intensity. 3) The reference signal is directly obtained via an RF cable connection or additional reference receiving antenna setup, and it is in its original format as analog signals. This is in contrast to existing technologies which use digital baseband signals as references. The analog reference signals obtained in this invention are inherently closer to the actual interference signals received by the receiving antenna of the main device. Moreover, the invention incorporates built-in delay adjustment, phase adjustment, and amplitude adjustment sub-modules to further optimize the acquired interference reference signal, making it even closer to the actual interference signal. 4) The process of recovering the reference signal does not involve digital-to-analog or analog-to-digital conversions, up-conversion, or down-conversion. This reduces degradation caused by limitations in analog device performance, such as increased noise, quality deterioration, and amplitude compression. Consequently, this enhances the interference cancellation effect, leading to improved performance.

DETAILED DESCRIPTION OF INVENTION

Embodiment 1

Figure 1:
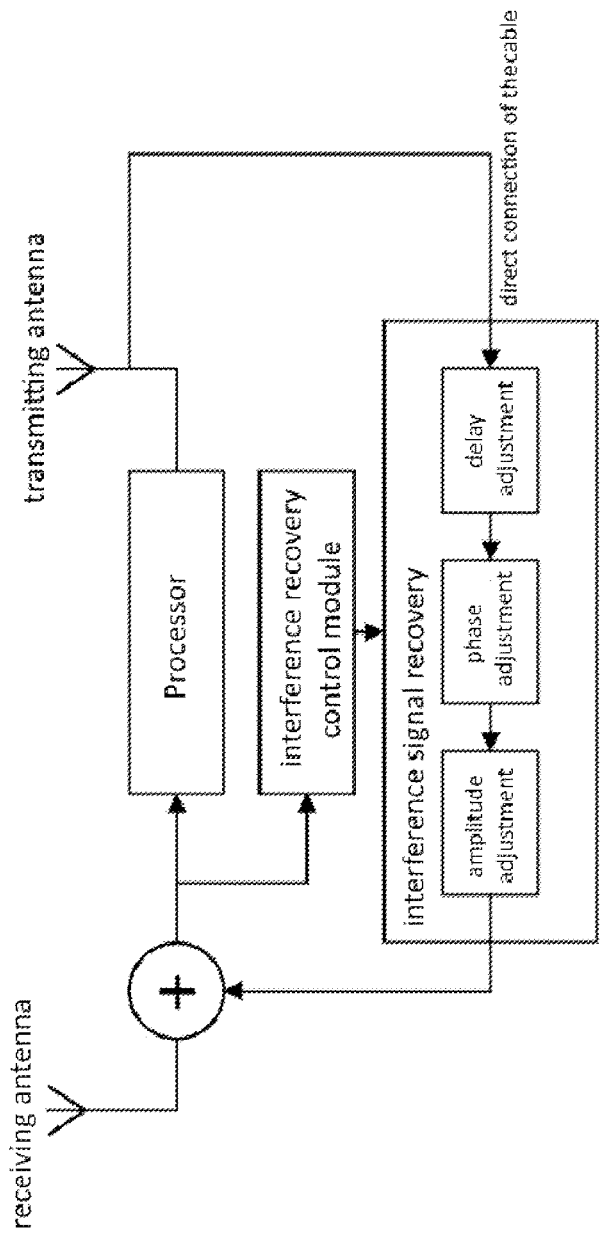
FIG. 1 is a schematic diagram of the system in Embodiment 1.

As shown in FIG. 1, this embodiment relates to the application of co-channel interference cancellation in an on-channel repeater.

An on-channel repeater is used to amplify and retransmit useful signals received from a distant main tower, thereby improving local area coverage. Typically, the receiving antenna of the on-channel repeater receives interference from its own transmitting antenna, which emits co-channel signals simultaneously. This interference is referred to as echo, and the echo signal is often much stronger than the received main signal, making it qualify for the definition of "interference signals" described in the present invention.

In this embodiment, the on-channel repeater operates on channel 25 and is established on a hill. It is over 80 kilometers away from the main TV signal transmission tower also operating on channel 25. Due to the obstruction of the hill, the useful signal received from the main TV transmission tower is weak (−60 dBm), making it ineffective for local coverage. Therefore, this on-channel repeater is constructed to supplement coverage. The target transmit power of this on-channel repeater is 100 watts.

In this embodiment, the on-channel repeater is located in an independent transmitter room on the hill. The room is positioned between the main transmission tower and the area requiring supplementary coverage. The main receiving antenna of the on-channel repeater is set on the roof of the transmitter room at a height of 9 meters, facing the direction of the main TV signal tower. The main transmitting antenna of the on-channel repeater, which is a directional antenna facing the area requiring supplementary coverage, is laterally more than 25 meters away from the main receiving antenna and has a height difference of more than 7 meters, facing the opposite direction of the main receiving antenna.

It can be observed that during the initial construction phase, the site was thoroughly planned, considering factors such as antenna orientation, antenna polarity, antenna distance, height difference, etc., to improve the isolation between receiving and transmitting antennas. When the current isolation between the main receiving and transmitting antennas is 75 dB, and the strength of the useful received signal (excluding echo) is −60 dBm. If no echo cancellation technology is employed, the echo received by the main receiving antenna needs to be at least 5 dB lower than the useful signal to operate. Therefore, it is deduced that the maximum achievable transmit power is −60−5+75=10 dBm, equivalent to 0.01 watts. This is an ultra-low-power transmission, far from the target power of 100 watts, making it impossible to achieve the supplementary coverage goal. When existing digital echo cancellation technology is employed within the on-channel repeater, depending on the technical solution and processing capability of the equipment used, if the echo is 10-15 dB, the maximum transmit power can be up to −60+15+75=30 dBm, i.e., 1 watt. However, this still falls significantly short of the coverage requirements. Therefore, to achieve the original goal of 100 watts, the main receiving antenna would still receive an echo with a strength of at least −50 to −75 dBm after considering antenna isolation, which is 35 dB higher than the useful signal (−60 dBm).

With such a significant echo, not to mention that existing digital echo cancellation technology and equipment in the current market cannot cancel it fundamentally, even the effective signal dynamic range of frequency conversion devices and analog-to-digital/digital-to-analog converters in the frequency conversion chain is typically only around 50 dB. When there is an echo that is 35 dB stronger than the main signal, the effective signal range of the main signal is only 15 dB. Even if the echo can be canceled, the residual signal quality is severely compromised. Amplifying such degraded signal quality to the ideal output power will still result in ineffective reception at the receiver, rendering the improvement of the on-channel repeater useless.

In this embodiment, the present invention introduces co-channel interference from the on-channel repeater's transmitting antenna as a reference signal in the analog domain. Through interference signal recovery processing in the analog domain, a co-channel interference analog signal is obtained. Subsequently, in the analog domain, the recovered simulated co-channel interference signal is subtracted from the signal received by the main receiving antenna. This subtraction is performed directly in the analog domain, completing the interference processing and resulting in an RF analog signal that has canceled interference.

In this embodiment, the interference signal source comes from the signal transmitted by the on-channel repeater itself and is at the same transmission point. It is a known signal, so it can be coupled out of the RF signal output from the transmitting antenna via a direct connection using cable. This coupled signal is directly input into the interference signal recovery module as a reference signal. The advantage of this approach is that the interference reference signal has stable intensity and complete signal content, and no other interference signals are mixed in. However, because electromagnetic waves propagate at different speeds in the air and in other media (such as cable), and are affected by the relative dielectric constant of the medium used, the received interference reference signal and the real interference in the signal received by the main receiving antenna may have differences in delay and phase. Additionally, there may be differences in amplitude between antenna reception and cable coupling. Therefore, corresponding interference signal recovery processing is required.

In this embodiment, priority can be given to adjusting the delay of the interference reference signal coming over the cable to correct the delay between the main receiving antenna and the feed cable. The delay value can be estimated using engineering estimation, setting an initially lower estimated delay as the initial value. Subsequently, through an exhaustive method, with a preset step size, the delay can be gradually increased until the optimal delay is found. Phase adjustment can be performed using the inflection point methods. Initially, a variable step size is set within an adjustable range, with the initial value as a starting point. The phase is then increased in one direction with a variable step size. When the performance continuously improves (e.g., improvement in signal-to-noise ratio, increase in effective power, improvement in shoulder or adjacent frequency suppression, etc.), it indicates the correct direction, and the attempt continues in the same direction. If the effect starts to deteriorate at a certain point, it indicates proximity to the inflection point. At this point, the step size should be reduced, and exploration should be conducted along the edge of the inflection point until a stable and optimal point is found, so the phase adjustment is complete. Finally, after recovery of delay and phase, because the direct connection method of the cable does not introduce other interference sources, a direct amplitude comparison between the signal received by the main receiving antenna and the interference reference signal after delay and phase correction can be performed. Amplitude adjustment can then be directly implemented. After completing the above operations sequentially, the current signal quality can be detected to determine whether it meets the preset goals or industry-standard requirements, deciding whether further adjustments and optimizations are needed in a second round. The selection, use order, and variables such as initial values, adjustable range, step size, direction, etc., for all sub-modules are controlled by the control signal from the interference recovery control module. The interference recovery control module adjusts and controls them in real time based on the calculated performance indicators.

The recovered interference signal is subtracted from the RF signal received by the main receiving antenna of the on-channel repeater, resulting in an RF analog signal that has canceled interference. On one hand, the RF analog signal is input into the interference recovery control module to generate interference control signals. On the other hand, it is further input into the subsequent processing module. For the On-channel repeater, the subsequent processing module can include operations such as down-conversion, analog-to-digital conversion, digital echo cancellation, signal amplification, digital-to-analog conversion, and up-conversion. Finally, the processed signal is output through the main transmitting antenna to complete the coverage improvement. Since echo cancellation in the analog domain has already been performed before entering the subsequent processing module for analog-to-digital/digital-to-analog conversion and up/down-conversion, the potential saturation of processing module devices by strong interference signals is greatly reduced, thereby ensuring the quality of the subsequent signal.

Figure 2:
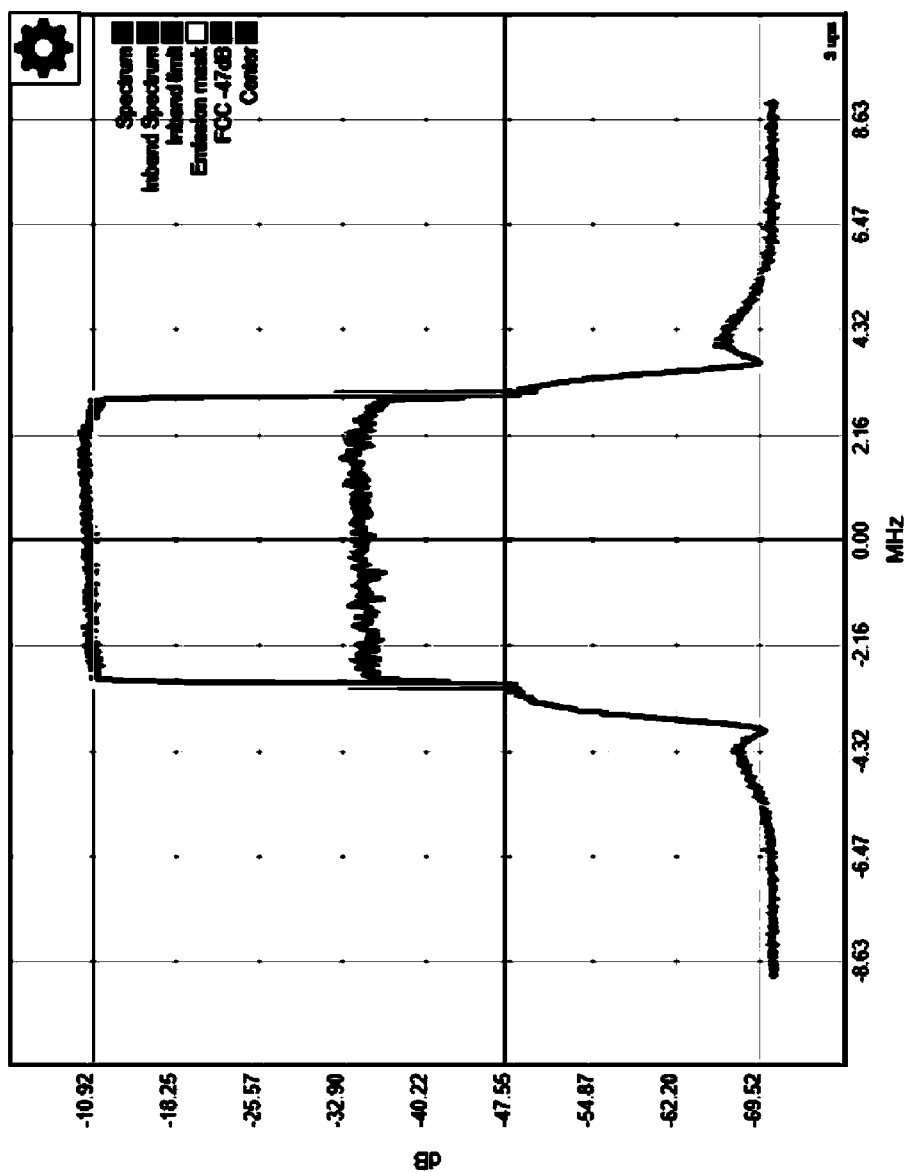
FIG. 2 is the schematic diagram of the effect in Embodiment 1.

Without the analog domain co-channel interference cancellation technology of the present invention, this site could only handle echoes of 10-15 dB with digital processing, achieving a maximum transmit power of 1 W. With the adoption of the present invention, this site can cancel at least 25 dB-30 dB of echoes in the analog domain, and then use existing digital echo cancellation technology to process the residual echoes in the digital domain. Overall, the on-channel repeater can cancel 35 dB of echoes received, thus achieving a total transmit power of −60+35+75=50 dBm, i.e., 100 W. The transmit power is at least 100 times (20 dB) higher than existing technologies without the present invention. At the same time, the quality of the transmitted signal is effectively guaranteed, even with a 35 dB echo, there is still at least 20 dB signal quality. When the echo is less than 25 dB, the signal quality is not compromised, fully meeting the requirements for transmission. As shown in FIG. 2, the spectrum measurement graph after analog/digital echo cancellation in the case of a 35 dB echo is shown. After echo cancellation, the useful signal is 35 dB lower than the useless signal. After echo cancellation, the useful signal (corresponding to the −10.92 dB line) is 23 dB stronger than the useless signal (corresponding to the −35 dB line), resulting in a difference of 58 dB before and after echo cancellation (23−(−35)=58 dB). This is equivalent to reducing the echo to 0.1% of the original level, achieving the desired final output signal MER of 20 dB, with shoulder attenuation of 53.6 dB on the left and 60.8 dB on the right.

Embodiment 2

Figure 3:
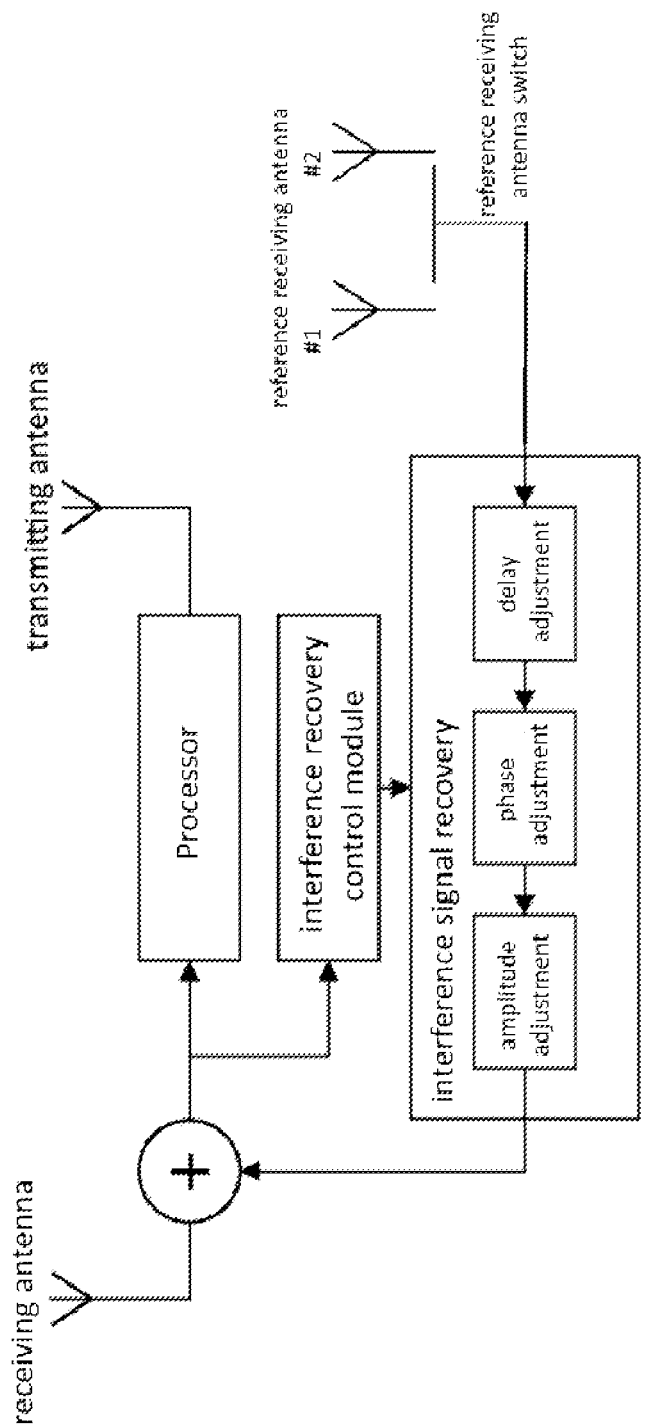
FIG. 3 is a schematic diagram of the system in Embodiment 2.

As shown in FIG. 3, this embodiment relates to adjacent channel interference cancellation: the main transmitting equipment with a receiving antenna simultaneously suffers from interference from nearby upper and lower adjacent channel broadcast signals.

In this embodiment, the main transmitting equipment has a main receiving antenna and a main transmitting antenna, with a transmit power of only 10 W (40 dBm). Because the received and transmitted signals are not on the same frequency and are set up far apart, there is no need to handle co-channel interference from the transmitting antenna itself. However, on the same tower, there are transmitters' transmitting antennas working on its upper and lower adjacent channels, and they are omnidirectional antennas with a high transmit power (2 kW, corresponding to 63 dBm). Even after passing through the transmitters' bandpass filter, the interference from each transmitter on the upper or lower adjacent channel to the main transmitting equipment in this embodiment still reaches 27 dBm (63−36=27 dBm, where 63 dBm is the broadcast signal transmit power, and 36 dB is the upper and lower shoulder level of the adjacent channel transmitters). When superimposed, the upper and lower adjacent channel interference received in this embodiment reaches 30 dBm, and it is only 10 dB lower than its own transmit signal of 40 dBm, exceeding its working threshold. Therefore, in this embodiment, the main transmitting equipment must process the received upper and lower adjacent channel interference signals, or it will not be able to operate.

In this embodiment, the analog domain interference cancellation technology of the present invention is adopted to introduce upper and lower adjacent channel interference as reference signals by adding antennas. The interference signal recovery processing is then performed to obtain the interference analog signals of the upper and lower adjacent channels. Subsequently, in the analog domain, the interference analog signals of the upper and lower adjacent channels are subtracted from the main received signal, thus completing analog interference cancellation processing in the RF domain to obtain an RF analog signal that has canceled interference. Specifically:

Step 1) The main transmitting equipment adds two reference receiving antennas (labeled as Reference Receiving Antenna 1 and 2) respectively facing the antennas transmitting the upper and lower adjacent channels signals (in this embodiment, the interference is from the transmitters operating on the upper and lower adjacent channels), to obtain upper and lower adjacent channel interference signals. Because the reference receiving antennas and the original receiving antenna of the main transmitting equipment are all at the same transmission point, and their distances to the upper and lower adjacent channels transmitters' antennas are similar, the delay adjustment module is optional (when the delay is small, it can be compensated by phase compensation).

In practice, only one of the interference signals from Reference Receiving Antenna 1 and 2 can be input into the interference signal recovery module at a time. The switching control is completed by the interference recovery control module. The processing sequence can be determined based on the relative interference sizes. The determination of interference size can be achieved through field measurements and engineering estimation. In this embodiment, interference from the upper adjacent channel (signal brought by Reference Receiving Antenna 1) may be recovered first.

Step 2) When it is confirmed that the delay is small enough to be ignored, phase adjustment is performed first. In this embodiment, a bisection method can be adopted:

① Define the range of phase adjustment, for example, from 0 to 256 degrees. This means that the minimum point is 0 degrees, the middle point is 128 degrees, and the maximum point is 256 degrees. These are used as control signals to compare the corresponding adjustments of these three points to find the best signal result (minimal interference from the adjacent channel to the main transmitted signal, optimal signal-to-noise ratio of the main transmitted signal, maximum effective power, best shoulder, etc.).

② If 128 degrees correspond to the best effect, the next three points to be tried are changed to 64 degrees, 128 degrees, and 192 degrees, and the results corresponding to these three points are compared again.

③ If the effect at 192 degrees is the best this time, the next three points to be tried are changed to 160 degrees, 192 degrees, and 224 degrees, and so on, until the step size is reduced to the minimum preset step size or the range is reduced to the minimum range, thus determining the optimal phase adjustment.

Step 3) When phase adjustment is completed, amplitude adjustment is performed. For example, when using an exhaustive method, define the amplitude difference range, such as 0–20 dB, and then with a preset step size (such as 0.25 dB), try amplitude adjustment variables of 0, 0.25 dB, 0.5 dB . . . until the maximum value of 20 dB is reached. Record the corresponding amplitude parameters during this process and determine the optimal amplitude adjustment that gives the best signal result.

Step 4) Check the current signal quality to see if it meets the preset or industry-standard requirements, thereby determining whether further adjustments and optimizations are needed.

The selection of all sub-modules, the order of use, and variables including but not limited to initial values, adjustable ranges, step sizes, directions, etc., all come from control signals of the interference recovery control module. The interference control recovery module adjusts and controls them in real time Step 5) Completing the interference reference recovery and elimination of upper adjacent-channel interference, the obtained RF analog signal has reduced upper adjacent-channel interference. Similar procedures can be applied to the interference reference signal obtained from the lower adjacent channel. Whenever dealing with a specific interference signal source, the corresponding interference signal received by the antenna is input into the interference signal recovery module. The algorithms for generating control signals and the sequence of variable adjustments for different interference signal sources can be similar or adjusted based on actual performance. In addition to performing a second round of adjustments for multiple control variables (delay, phase, amplitude) after the initial adjustments for the same interference source, a further round of optimization can be conducted after all interference sources have been addressed. For example, addressing the upper adjacent channel first, then the lower adjacent channel, and finally optimizing based on the existing adjustment results for the upper adjacent channel and/or lower channel adjacent channel interference cancellation to achieve a comprehensive optimal outcome.

In this implementation, before using the interference elimination technology in the analog domain as described by the present invention, the in-band interference from upper and lower adjacent channels to the main transmitting equipment was as high as 30 dBm, and an effective method for cancellation was lacking. With the adoption of the present invention, interference from upper and lower adjacent channels can be reduced by at least 23.28 dB in the analog domain, as shown in Table 1.

TABLE 1

| Item | Power Level |
| --- | --- |
| Main Signal | 40.12 dBm |
| Noise Level | 30.04 dBm |
| Output Level | 40.41 dBm |
| Noise Cancellation | 23.28 dB |

Compared to before the application of the present invention, the interference has been reduced to 7% of the previous level. As a result, the main transmitting equipment meets the transmission quality requirements and can transmit at a power level of 40 dBm.

Embodiment 3

Figure 4:
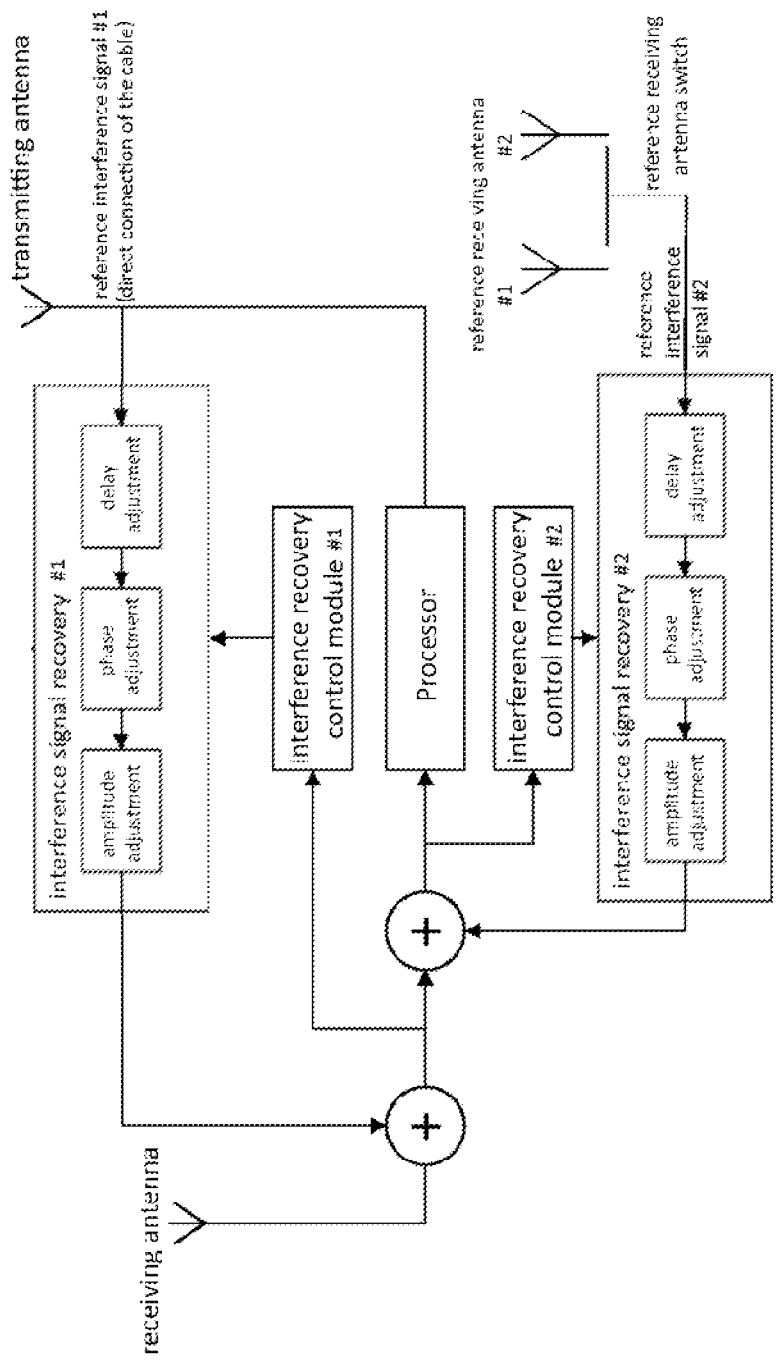
FIG. 4 is a schematic diagram of the system in Embodiment 3.

As shown in FIG. 4, this embodiment involves a scenario where the same-frequency repeater is simultaneously subjected to co-channel interference and adjacent-channel interference from both upper and lower channels.

In this embodiment, the interference signals include a co-channel echo from the on-channel repeater's own transmitting antenna, which is 35 dB higher than the main signal, and 30 dB adjacent-channel interference from the omnidirectional antennas of the broadcast transmitters working on the upper and lower channel at the same transmitting tower. Without the interference cancellation method in the analog domain proposed by the present invention, normal operation would be impossible.

For the co-channel interference in this embodiment, the interference signal source is the echo generated by the on-channel repeater's transmission, and it is a known signal. Therefore, it can be coupled out from the final output of the on-channel repeater's transmitting antenna by directly connecting the cable, obtaining interference signal 1, and then inputting it into interference signal recovery module 1 for subsequent processing.

For the upper and lower adjacent-channel interference in this embodiment, which is a non-self-transmitted signal and therefore is an unknown signal, two reference receiving antennas (labeled as reference receiving antenna 1 and 2) are added to the on-channel repeater in the respective directions of the upper and lower adjacent interference source. The interference signal 2 is obtained, and then it is input into interference signal recovery module 2 for subsequent processing.

In this embodiment, the processing sequence of co-channel and upper and lower adjacent-channel interference received simultaneously can be determined based on their respective interference magnitudes. The determination of interference magnitude can be achieved through on-site measurement and engineering estimation. If the co-channel interference in this embodiment has a significant impact, it is considered to process the co-channel interference first. The interference signal 1, which comes from the cable directly connected, is input into the interference signal recovery module 1 for subsequent processing, including delay adjustment, phase adjustment, and amplitude adjustment.

The order of delay adjustment, phase adjustment, and amplitude adjustment can be optimized based on the on-site situation. For example, delay adjustment can be estimated and preset within a certain range (such as 0 to 100 ns) and with a step size (such as 1 ns). Through the exhaustive method (trying 0 ns, 1 ns . . . up to 100 ns), the optimal delay adjustment can be determined. Phase adjustment can first use the bisection method to narrow down the range from the full range to a roughly defined range (such as 45 degrees to 75 degrees), and then within this range, the optimal phase can be measured through the exhaustive method. Amplitude adjustment can also use the inflection point method. Within the preset range, try each optional value in a certain direction, and find the inflection point (where the effect starts to get better or worse) by comparing the points before and after. In the inflection point method, a variable step size can be used, and in the inflection point area, the step size can be reduced and the amplitude can be increased or decreased back and forth until the optimal amplitude adjustment is reached. After completing the above adjustments, the current signal quality can be checked to see if it meets the preset goals or industry standard requirements, thereby determining whether further adjustments and optimizations are needed in the second round.

All the choices, sequences, and variables of the submodules, including but not limited to initial values, adjustable ranges, step sizes, directions, etc., come from the control signals of the interference recovery control module. The interference recovery control module adjusts and controls them in real time based on the calculated performance indicators.

The interference simulation signal 1 output by the interference recovery module 1 is subtracted from the main signal received by the main receiving antenna of the on-channel repeater. This subtraction results in the cancellation of the co-channel interference signal in the RF simulation signal, which is then input into the interference recovery control module 1. The interference recovery control module 1 performs comprehensive performance calculations (SNR, effective power, shoulder or adjacent channel suppression, etc.) on the input signal, and outputs corresponding control signals, including the choice of sub-module use, sequence, delay adjustment, phase adjustment, and amplitude adjustment, to control the interference signal recovery module 1 again.

After the cancellation of the co-channel interference, if it is determined that the lower adjacent-channel interference is significant, priority can be given to the cancellation of lower adjacent-channel interference. At this time, the reference receiving antenna switches to the reference receiving antenna corresponding to the lower adjacent channel (when it is antenna 2), obtaining interference signal 2, which is then input into interference signal recovery module 2. According to the control signals from interference control module 2, delay, phase, and amplitude adjustments are performed in interference signal recovery module 2, obtaining interference simulation signal 2, which is then sent to the second subtractor, subtracted from the RF signal that has already eliminated the co-channel interference. The resulting RF simulation signal is then input into interference recovery control module 2 to generate control signals for controlling interference signal recovery module 2.

Similarly, after eliminating lower adjacent-channel interference, the reference receiving antenna switches to the other reference receiving antenna (which may be antenna 1) and repeats the above operations.

When more than one interference source is affecting the transmission signal of the on-channel repeater on-site, additional cable or multiple dedicated reference antennas can be introduced to introduce reference signals. The interference signal recovery and cancellation can be performed in sequence according to the above method. When it is the turn of a particular interference signal source, the interference signal received by the corresponding feed cable or antennas is input into the corresponding interference signal recovery module. The algorithms and variable adjustment sequences of different interference signal sources can be the same, or they can be adjusted based on actual effects. In addition to performing a second round of adjustment and optimization for multiple control variables (phase, amplitude) for the same interference source after the initial round of adjustment, a new round of optimization for each interference source can be performed after all interference sources have finished processing. For example, first process the co-channel interference, then process the lower adjacent channel interference, and then the upper adjacent channel interference. After all are finished, based on the existing adjustment results, perform optimization for co-channel, lower adjacent channel, and upper adjacent channel interference elimination again to obtain the best comprehensive results.

The specific implementations described above can be locally adjusted by those skilled in the art within the scope of the present invention's principles and objectives, and the protection scope of the present invention is defined by the claims and is not limited by the above specific embodiments.

What is claimed is:

1. A method of canceling co-channel and adjacent channel interference in an analog domain characterized in that, on-site detection and judgment of existing co-channel and/or adjacent-channel interference signal sources are performed on a wireless communication device with a receiving antenna at a transmission point; a reference signal of a co-channel and/or adjacent channel from an interference signal source is collected by direct connection of a cable or by adding an antenna; an analog co-channel and/or adjacent-channel interference signal is obtained; then in the analog domain, the co-channel and/or adjacent-channel interference signal is subtracted from a received signal received by the receiving antenna of the wireless communication device to complete analog interference cancellation processing, thereby obtaining an interference-eliminated RF (radio frequency) analog signal; wherein the on-site detection and judgment refers to: at the transmission point of the wireless communication device, detecting whether there are other authorized signals on the co-channel and adjacent channels, and determining whether the detected other authorized signals are interference signals by measuring signal intensity of the authorized signals at the transmission point of the wireless communication device.

2. The method of canceling co-channel and adjacent channel interference in the analog domain according to claim 1, wherein the interference signals are judged by the following criteria: the interference signal intensity is greater than signal intensity received by the receiving antenna of the wireless communication device; the interference signal intensity is less than the signal intensity received by the receiving antenna of the wireless communication device, and causing the received signal of the wireless communication device to be unavailable.

3. The method of canceling co-channel and adjacent channel interference in the analog domain according to claim 1, wherein the direct connection of the cable refers to directly connecting the interference signal source or output of the interference signal through the cable to directly obtain the interference signal as the reference signal; the additional antenna refers to adding an interference receiving antenna in the wireless communication device which is facing the direction of the interference signal source to indirectly obtain the interference signal as the reference signal.

4. The method of canceling co-channel and adjacent channel interference in the analog domain according to claim 1, further comprising an interference signal recovery processing including: adjusting delay and/or phase and/or amplitude of the reference signal obtained directly or indirectly, and recovering the analog co-channel and/or adjacent-channel interference signal.

5. The method of canceling co-channel and adjacent channel interference in the analog domain according to claim 1, wherein the analog interference cancellation processing refers to: in the analog domain, a RF signal received from the receiving antenna of the wireless communication device, subtract a recovered analog co-channel and/or adjacent-channel interference signal to obtain the interference-eliminated RF analog signal, an adder or combiner in the analog domain to eliminate the interference of the RF analog signal through a dynamic adjustment; a maximum signal-to-noise ratio, a maximum effective power, a maximum shoulder, and a best adjacent frequency suppression are achieved.

6. The method of canceling co-channel and adjacent channel interference in analog domain according to claim 5, the dynamic adjustment is iterated by an exhaustive method, an inflection point method, a bisection method, or a combination thereof based on a direction of a performance change of the RF analog signal after the interference signal is eliminated.

7. A system of canceling co-channel and adjacent channel interference in an analog domain comprising an interference signal recovery module, and an interference recovery control module, wherein: the interference signal recovery module receives at least one reference signal directly or indirectly and outputs a co-channel and/or adjacent-channel interference analog signal; the interference analog signal is subtracted from a received signal from a receiving antenna of a wireless communication device and the result used as an input of the interference recovery control module and other subsequent processing modules; the interference recovery control module outputs control signals to the interference signal recovery module based on calculated indicator changes; the control signals adjust/confirm the specific operations and parameters involved in a recovery process; optimized co-channel and/or adjacent-channel interference analog signals, when subtracted from the signal received by a receiving antenna, result in an RF analog signal with reduced levels of interference.

8. The system of canceling co-channel and adjacent channel interference in the analog domain according to claim 7, wherein when there are more than two interference signals, the interference signals are connected through cables or additional receiving antennas to obtain reference signals.

9. The system of canceling co-channel and adjacent channel interference in the analog domain according to claim 7, wherein the interference signal recovery module comprises: a delay adjustment sub-module, a phase adjustment sub-module, and an amplitude adjustment sub-module which are respectively connected to the interference recovery control module and receive control signals of the delay adjustment sub-module, the phase adjustment sub-module, and the amplitude adjustment sub-module; wherein the delay adjustment sub-module is used to adjust the delay between an interference reference signal and the RF analog signal by the receiving antenna of the wireless communication device, and the phase adjustment and amplitude adjustment sub-modules are used to adjust the phase and amplitude of the interference analog signal reference signal as close as possible to the interference signal contained in the received signal that ensures accurate interference recovery and interference cancellation; the control signals include the selection of sub-modules use and sequence, interference delay settings, phase adjustment, and amplitude adjustment settings.

10. The system of canceling co-channel and adjacent channel interference in analog domain according to claim 7, wherein the adjustment by the control signals includes setting a user-defined adjustable range and adjustable step size for control signals of time delay, phase, and amplitude, and then using an exhaustive method, an inflection point method, a bisection method or a combination thereof to obtain an optimal solution of signal for one variable in the control signals each time; after fixing this variable, the optimal solution is obtained one by one for other variables.

* * * * *